US009779413B2

(12) United States Patent
McElfresh et al.

(10) Patent No.: US 9,779,413 B2
(45) Date of Patent: *Oct. 3, 2017

(54) METHOD AND SYSTEM FOR OPTIMUM PLACEMENT OF ADVERTISEMENTS ON A WEBPAGE

(75) Inventors: Charles McElfresh, San Marino, CA (US); Paul Mineiro, Los Angeles, CA (US); Michael Radford, Los Angeles, CA (US)

(73) Assignee: Excalibur IP, LLC, New York, NY (US)

(*) Notice: Subject to any disclaimer, the term of this patent is extended or adjusted under 35 U.S.C. 154(b) by 518 days.

This patent is subject to a terminal disclaimer.

(21) Appl. No.: 13/616,711

(22) Filed: Sep. 14, 2012

(65) Prior Publication Data

US 2013/0047062 A1 Feb. 21, 2013

Related U.S. Application Data

(60) Continuation of application No. 11/963,551, filed on Dec. 21, 2007, which is a continuation of application
(Continued)

(51) Int. Cl.
*G06Q 30/02* (2012.01)

(52) U.S. Cl.
CPC ......... *G06Q 30/0244* (2013.01); *G06Q 30/02* (2013.01); *G06Q 30/0201* (2013.01);
(Continued)

(58) Field of Classification Search
CPC .................................................. G06Q 30/02
(Continued)

(56) References Cited

U.S. PATENT DOCUMENTS 5,659,732 A 8/1997 Kirsch
5,664,115 A 9/1997 Fraser
(Continued)

FOREIGN PATENT DOCUMENTS

JP 11316764 11/1999
WO WO97/21183 * 6/1997 ........... G06F 151/00
(Continued)

OTHER PUBLICATIONS

John D. Leckenby, Hongpil Hong, Using Reach/Frequency for Web Media Planning; Journal of Advertising Research; Jan.-Feb. 1998, pp. 7-20.*

(Continued)

*Primary Examiner* — Amanda Abrahamson
*Assistant Examiner* — Michael Stibley
(74) *Attorney, Agent, or Firm* — Brinks Gilson & Lione

(57) ABSTRACT

A method and system for placement of graphical objects on a page to optimize the occurrence of an event associated with such objects. The graphical objects might include, for instance, advertisements on a webpage, and the event would include a user clicking on that ad. The page includes positions for receipt of the object material. Data regarding the past performance of the objects is stored and updated as new data is received. A user requests a page from a server associated with system. The server uses the performance data to derive a prioritized arrangement of the objects on the page. The objects are arranged according to a calculation and returned to the user on the requested page.

20 Claims, 7 Drawing Sheets

Related U.S. Application Data

No. 10/366,853, filed on Feb. 14, 2003, now Pat. No. 7,373,599, which is a division of application No. 09/285,929, filed on Apr. 2, 1999, now Pat. No. 6,907,566.

(52) U.S. Cl.
CPC ..... *G06Q 30/0243* (2013.01); *G06Q 30/0246* (2013.01); *G06Q 30/0247* (2013.01); *G06Q 30/0254* (2013.01); *G06Q 30/0255* (2013.01); *G06Q 30/0269* (2013.01); *G06Q 30/0273* (2013.01); *G06Q 30/0277* (2013.01); *Y10S 707/99933* (2013.01)

(58) Field of Classification Search
USPC .......................................................... 705/14
See application file for complete search history.

(56) References Cited

U.S. PATENT DOCUMENTS

| | | |
|---|---|---|
| 5,704,060 A | 12/1997 | Del Monte |
| 5,717,923 A | 2/1998 | Dedrick |
| 5,724,424 A | 3/1998 | Gifford |
| 5,724,521 A | 3/1998 | Dedrick |
| 5,724,524 A | 3/1998 | Hunt et al. |
| 5,740,549 A | 4/1998 | Reilly et al. |
| 5,748,954 A | 5/1998 | Maudlin |
| 5,752,238 A | 5/1998 | Dedrick |
| 5,768,521 A | 6/1998 | Dedrick |
| 5,778,367 A | 7/1998 | Wesinger, Jr. et al. |
| 5,794,210 A | 8/1998 | Goldhaber et al. |
| 5,826,241 A | 10/1998 | Stein et al. |
| 5,826,260 A | 10/1998 | Byrd et al. |
| 5,848,396 A | 12/1998 | Gerace |
| 5,848,397 A | 12/1998 | Marsh et al. |
| 5,848,407 A | 12/1998 | Ishikawa et al. |
| 5,852,820 A | 12/1998 | Burrows |
| 5,855,008 A | 12/1998 | Goldhaber et al. |
| 5,862,223 A | 1/1999 | Walker et al. |
| 5,864,845 A | 1/1999 | Voorhees et al. |
| 5,864,846 A | 1/1999 | Voorhees et al. |
| 5,903,882 A | 5/1999 | Asay et al. |
| 5,918,014 A | 6/1999 | Robinson |
| 5,920,854 A | 7/1999 | Kirsch et al. |
| 5,920,859 A | 7/1999 | Li |
| 5,930,777 A | 7/1999 | Barber |
| 5,937,392 A | 8/1999 | Alberts |
| 5,945,975 A | 8/1999 | Lundrigan et al. |
| 5,948,061 A | 9/1999 | Merriman et al. |
| 5,991,735 A | 11/1999 | Gerace |
| 6,009,409 A | 12/1999 | Adler et al. |
| 6,009,410 A | 12/1999 | LeMole et al. |
| 6,078,866 A | 6/2000 | Buck et al. |
| 6,078,916 A | 6/2000 | Culliss |
| 6,128,599 A | 10/2000 | Walker et al. |
| 6,138,155 A | 10/2000 | Davis et al. |
| 6,185,558 B1 | 2/2001 | Bowman et al. |
| 6,269,361 B1 | 7/2001 | Davis et al. |
| 6,272,507 B1 | 8/2001 | Pirolli et al. |
| 6,278,966 B1 | 8/2001 | Howard et al. |
| 6,285,987 B1 | 9/2001 | Roth et al. |
| 6,285,999 B1 | 9/2001 | Page |
| 6,286,005 B1 | 9/2001 | Cannon |
| 6,288,717 B1 * | 9/2001 | Dunkle .......................... 715/763 |
| 6,295,061 B1 | 9/2001 | Park et al. |
| 6,311,185 B1 | 10/2001 | Markowitz et al. |
| 6,334,133 B1 | 12/2001 | Thompson |
| 6,366,918 B1 | 4/2002 | Guttman et al. |
| 6,377,993 B1 | 4/2002 | Brandt |
| 6,379,251 B1 | 4/2002 | Auxier et al. |
| 6,411,936 B1 | 6/2002 | Sanders |
| 6,442,598 B1 | 8/2002 | Wright |
| 6,470,269 B1 | 10/2002 | Adar et al. |
| 6,480,890 B1 | 11/2002 | Lee, Jr. |
| 6,484,149 B1 | 11/2002 | Jammes |
| 6,487,538 B1 | 11/2002 | Gupta et al. |
| 6,594,641 B1 | 7/2003 | Southam |
| 6,714,975 B1 | 3/2004 | Aggarwal et al. |
| 6,718,551 B1 | 4/2004 | Swix et al. |
| 6,745,229 B1 | 6/2004 | Gobin |
| 6,782,431 B1 | 8/2004 | Mukherjee |
| 6,829,610 B1 | 12/2004 | Hickman |
| 6,880,123 B1 | 4/2005 | Landsman et al. |
| 6,892,238 B2 | 5/2005 | Lee et al. |
| 7,069,511 B2 | 6/2006 | Maritzen |
| 7,136,870 B1 | 11/2006 | McGloughlin |
| 7,831,470 B1 | 11/2010 | Walker |
| 2001/0011246 A1 | 8/2001 | Tammaro |
| 2001/0014868 A1 | 8/2001 | Herz et al. |
| 2001/0018673 A1 | 8/2001 | Goldband |
| 2001/0042051 A1 | 11/2001 | Barrett |
| 2001/0043273 A1 | 11/2001 | Herrod |
| 2001/0043697 A1 | 11/2001 | Cox |
| 2002/0002598 A1 | 1/2002 | Van Allen |
| 2002/0004735 A1 | 1/2002 | Gross |
| 2002/0004753 A1 | 1/2002 | Perkowski |
| 2002/0040365 A1 | 4/2002 | Price |
| 2002/0087383 A1 | 7/2002 | Cogger |
| 2002/0099600 A1 * | 7/2002 | Merriman et al. .............. 705/14 |
| 2002/0099812 A1 | 7/2002 | Davis et al. |
| 2002/0171581 A1 | 11/2002 | Sheynblat |
| 2007/0299682 A1 | 12/2007 | Roth et al. |

FOREIGN PATENT DOCUMENTS

| | | |
|---|---|---|
| WO | WO 97/22066 | 6/1997 |
| WO | WO 99/20486 | 9/1999 |
| WO | WO 99/48028 | 9/1999 |
| WO | WO 00/16218 | 3/2000 |
| WO | WO 00/41090 | 7/2000 |

OTHER PUBLICATIONS

Arch G. Woodside and Praveen K. Soni; Performance Analysis of Advertising in Competing Media Vehicles; Journal of Advertising Research; Feb./Mar. 1999; pp. 53-66.*
Caroline Cartellieri, Andrew J. Parsons, Varsha Rao, and Michael P. Zeisser; The real impact of Internet advertising; The McKinsey Quarterly 1997 No. 3 pp. 45-62.*
Debbora T.A. Heflin, Robert C. Haygood; Effects of Scheduling on Retention of Advertising Messages; Journal of Advertising, vol. 14, No. 2, 1985, pp. 41-64.*
Surendra N. Singh, at al. "Web Home Pages as Advertisements" Communications of the ACM, Aug. 1999Nol. 42, No. 8, pp. 91-98.
Brin, Sergey et al., The Anatomy of a Large Scale Hypertextual Web Search Engine~, *Computer Networks and ISDN System*, North Holland Publishing, Amsterdam, NL, dated Apr. 14, 1998, pp. 1-20.
Doran, David, "Search Engines . . . Their popularity, their secrets, their flaws", *Entrepreneur*, Jul. 1998, p. 18.
Glaser, Ken, "Who Will GoTo.com?", OnlinePress.com, dated Feb. 20, 1998, 2 pages.
Kramer, Ralf et al., "Thesaurus federations: loosely integrated thesauri for document retrieval in networks based on Internet technologies", *Int. J. Digit Libr.*, 1997, pp. 122-131.
Sullivan, Danny, "GoTo Sells Positions", *The Search Engine Report*, Dated Mar. 3, 1998, 4 pages.
"GoTo.com Announces First Round of Financing, totaling More Than $6 Million, Led by Draper Fisher Jurvetson", *Business Wire*, dated May 19, 1998, printed from Dialog Gale Group New products, 2 pages.
New Service Puts Ad Auction, Search Engine Under One Roof, *Electronic Advertising & Marketplace Report*, dated Apr. 28, 1998, Vo. 12, Issue 8, 2 pages.
Database of Corporate Resource.Net, New Service Puts Ad Auction Search Engine Under One Roof, Electronic Advertising & Marketplace Report, vol. 12, Issue 8, Apr. 1998, p. 6.
Espe, "Online Search Engines Start to Charge for Listings", Washington Business Journal, vol. 18, Issue 1, May 1999, p. 31.

(56) References Cited

OTHER PUBLICATIONS

Dawson et al., "2 Search Sites Narrow Their Parameters", Adweek-Western Edition, vol. 48, Issue 42, Oct. 1998, p. 1.
Database of Corporate ResourceNet, "Bits", from Adweek-Eastern Edition, vol. 40, Issue 14, Apr. 1999, p. 46.
Komando, "Searching for Search Engines—from Dogpile to Deja News", Business First-Columbus, vol. 14, Issue 43, Jun. 1998, p. 46.
Database of Corporate ResourceNet, "New Services Aim to Boost Efficiency of Search Engines", Electronic Advertising & Marketplace Report, vol. 12, Issue 13, Jun. 1998, p. 6.
Database of Corporate ResourceNet, "Goto.com Chooses Quest's SharePlex(R) for Oracle Software to Ensure Uptime for Business-Critical Web Site", PR Newswire, Jun. 2000.
Database of Corporate ResourceNet, "Capitalist Tool", Time Canada, vol. 151, Issue 8. Mar. 1998, p. 41.
Database of DialogClassic(m), "Homestead Technologies' Continued Success Draws $17.50 Million in second Round of Venture Funding", PR Newswire, Apr. 1999.
"APS Search Tools—Patent Search Client Strategy", by US Patent & Trademark Office, Sep. 1997.
"Frequently Asked Questions NT Image Search & Retrieval (IS&R)", by US Patent & Trademark Office, Dec. 1997.
"Chapter 1—Introduction to Dialog", by Dialog Information Service, Inc. pp. 1-1 to 1-14.
"Automated Patent System (APS) Workstation Reference Manual", by US Patent & Trademark Office, Jul. 1996.
Frentzen, Jeff, "Help for Getting the Word Out About Web Sites", PC Week, v14, n46, p. 27(1), Nov. 3, 1997.
Miller, Karen L., "Improve Your Ranking (Building Web Sites to Attract Web Searches)", Home Office Computer, v16, n1, p. 51 (2) Jan. 1998.
Wang, "Engines Battle Irrelevance of Results—New Search Service Hope to Fill the Void", by Internet World, Feb. 1998.
Vondr Haar, "Searching for the Highest Bidder", from Intert@active week.
Mardesich, "Web Site Operators Pay for Top Billing-Search Engine Allows Site Sponsors to Buy Place on Special List", from Knight Ridder Newspapers, Mar. 1998.
Hilty, "GoTo.Hell—What Happens When on Line Search Engine Accepts Cash From Web Sites?" from http://www.ocweekly.comllink/archives/97/27/byte-3.11.98-1.html, Mar. 1998.
Flynn, "With GoTo.com's Search Engine, the Highest Bidder Shall Be Ranked First", by the New York Times, Mar. 1998.
"Going, Going . . . ," from a Closer Look of the Walt Street Journal—Marketplace, Apr. 1998.
"Coursey.com", David Coursey's Insider report on Personal Computing, the Internet and Communications, Mar. 1998.
"News Watch About Search Engines", from http://searchenginewatch.com/ness.html, Feb. 1998.
"Search Engine Start Up to Auction Listings", from http://www.adage.com/interactive/dailylindex/html, Feb. 1998.
Pelline, "Pay-for-placement gets another shot", from http://www.newscom.?news/item/0,4,19307,00.html, Sep. 1997.
IBM Technical Disclosure Bulletin, "Organizing a Ranked List of Search Matches", Nov. 1994.
Jeffrey Brewer, ClickZ Today, Aug. 18, 1998, "Pay-For-Performance: Creating More and Better Value", obtained at the internet address http://www.clickz.com, Aug. 18, 1998.
Jesse Berst, ZDNet, Aug. 17, 1998, "Search Sites' Shocking Secret", obtained at the internet address http://www.zdnet.com/anchordesk/story/story_2432.html, Aug. 17, 1998.
Sara Fisher, "Budding Internet Firm Finds Niche in Satisfaction", L.A. Business Journal, Aug. 10, 1998.
"Disclosure Rules", The Industry Standard—The Newsmagazine of the Internet Economy, Aug. 10, 1998.
G. David Doran, "Pay to Play", Entrepreneur, Jul. 1998, p. 18.
Advertising Age-Interactive Daily Homepage; obtained at the internet address http://www.adage.com/interactive/daily/index.html, Jun. 8, 1998.
Kim Komando, "With About 320 Million Sites, Search Engines Offer Some Help", copyright 1998, Los Angeles Times Syndication.
Margot Williams, "How to Ease Your Online Searches", Lansing State Journal, Jun. 1, 1998.
"GoTo.com Gets Venture Funding", Internet World Magazine, Jun. 1, 1998.
Sasha Alyson, "Searching the Search Engines", Front Page, May 8, 1998.
Advertising Age-Interactive Daily Homepage, Feb. 23, 1998, "Search Engine Startup to Auction Listings", obtained at the internet address http://www.adage.com/interactive/mdaily/index.html.
Brian McWilliams, PC World Online, Feb. 23, 1998, "Search Engine to Sell Top Positions on Results Lists", obtained at the internet address http://www.pcworld.com/news/daily/data/0298/9880223173204.html.
Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti. ..le/archive/1998/02/21/BU102470.DTL.
Nelson Wang, "Engines Battle Irrelevance of Results", from http://www. internetworld.com/print/current/news/19980223-battle.html, Feb. 1998.
Search Engine Watch, Feb. 21, 1998, "GoTo Sells Positions", obtained at the internet address http://www.searchenginewatch.com/news.html, Feb. 23, 1998.
Jodi Mardesich, "Search Engine Charges Hit Sites", from http://wwww.sjmercury.com/businrss/center/goto022198.html, Feb. 1998.
"Going, Going . . . ", The Wall Street Journal, Apr. 1998. P. B1.
Don Clark, "Start-Up Plans Internet Search Service Tying Results to Advertising Spending", The Wall Street Journal, Feb. 20, 1998.
Laurie J. Flynn, "With GoTo.com's Search Engine, The Highest Bidder Shall Be Ranked First", The New York Times, Mar. 1998, p. C1.
Jodi Mardesich, "Web Site Operators Pay for Top Billing", The News—Herald (Willoughby, OH), Mar. 2, 1998.
Patricia Riedman, "Search Engine Startup to Auction Listings", Advertising Age Magazine, Feb. 23, 1998, p. 34.
Steven Vonder Haar, ZDNet,com, Feb. 19, 1998, "Searching for the Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N.Y. May 25, 1998.
Jeff Pelline, "New Search Engine Goes Commercial", CNET News. com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.
Nick Wingfield, Staff Writer, CNET News.com, May 22, 1996, "Another Engine Takes Ads by the Click", obtained at the internet address http://www.news.com/News/Item/0,4,1387,00,html, Jul. 29, 1999.
Rose Aguilar, Staff Writer, CNET News.com, Apr. 29, 1996, "New Ad Model Charges by the Click", obtained at the internet address http://www.news.com/News/Item/0.4,1199,00.html, Jul. 29, 1999.
Alex Lash, Staff Writer, CNET News.com, Dec. 11, 1996, "Open Text Updates Tools", obtained at the internet address http://www.news.com/News/Item/OA,6118,00.html, Jul. 29, 1999.
"About SearchUP, Inc.", Jul. 15, 1999, obtained at the internet address http://www.searchup.com/about.cfm.
"Testimonials", Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.

(56) References Cited

OTHER PUBLICATIONS

Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.netfsearchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help for Getting the Word Out About Web Sites", PC Week, Vo. 14, No. 46, Nov. 3, 1997, p. 27(1).
Article from the Search Engine Report, "GoTo to Sell Positions", Mar. 3, 1998, http://www.searchenginewatch.com/sereport/9803-to-to-html.
Article from CNET News, "Engine Sells Results, Draws Fire", Jun. 21, 1996, http://www.news.com/News?Item/04,1635,00.html.
Press release on Lightweight Directory Access protocol (LDAP), Netscape Comm. Corp. Mountain View, CA. Apr. 1996.
ClickMail Central directory, circa Apr. 1996, http://www.oneclick.com/server/specs.html, 4 pages.
GoTo.com, circa 1998, at www.goto.com/d/search=results, 5 pages.
Northern Light, circa 1997-98, at sirocco.northernlight.com.
Laura Rich, Adweek Online IQ News Online, Feb. 23, 1998, "New Search Engine Allows Sites to Pay Their Way to Top", from http://www.adweek.com/iq/ iqnews02.asp, Feb. 23, 1998.
Smith, Laura B., article "Going . . . Gone", PC Week, vol. 13, No. 34, Aug. 26, 1996, p. E1 (2), http://www.dlalog-classic.com/DialogClassic/dialog.
Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.
Press Release article titled "GoTo.com Announces First round of Financing, Totaling More Than $6 Million, Led by Draper, Fisher Jurvetson", Business Wire, dated May 19, 1998, printed from the Internet at http://www.dialoaclassic.com/main.vingw, 2 pages.
News of the Week articles, Telephony, May 1, 1995, pp. 8 and 10.
Nuts 'N Bolts articles, Target Marketing, Oct. 1997, 1 page.
DoubleClick TestIt!, obtained at the internet address: http://web.archive.org/web/19980205034316/www.doubleclick.com/nf/adinfo/testiset.htm, dated Oct. 16, 2002,4 pages.
DoubleClick Frequently Asked Questions, obtained at the internet address: http://web.archive.org/web/19980205033925/www.doubleclick.com/nf/adinfo/facts.htm, dated Oct. 16, 2002, 5 pages.
Google Search, communication from Jeffrey Brewer at Jeffrey@goto.com, titled "Need reverse stemming software," dated May 27, 1998, obtained at the internet address: http://groups.google.com/groups?selm=356CEE4A8DE882A8%40goto.com, on Dec. 19, 2002, 1 page.
Ketchpel, Steven P. at al., "U-PAI: A Universal Payment Application Interface," conference material article from the Second USENIX Workshop on Electronic Commerce Proceedings, Oakland, California, Nov. 18-21, 1996, 17 pages.
Schwartz, Randal L., "Click-Through Tracking in Perl", Web Techniques, dated May 1998, located at the internet address: www.webtechniques.com, 3 pages.
Van Roeden, Adriaan, "Your Own Search Engine With SWISH, A Custom Search Facility for Your Web Site", Web Techniques, dated Nov. 1996, located at the internet address: www.webtechniques.com, pp. 63-66 pages.
Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.
Help on Making Queries—Search by Company or Product, obtained at the internet address: http://web.archive.org/web/19981203050002/solutions.sun.com/search-help.htm, printed on Dec. 19, 2002, 4 pages.
Online Updating, Sun Microsystems Sun Solutions Catalog obtained at the internet address: http://web.archive.org/web/19990220190636/solutions.sun.com/editmodule/help.html, printed on Dec. 19, 2002, 2 pages.
Ebay—Your Personal Trading Community, Seller Service Listings, dated Apr. 28, 1999, printed from the Internet at http://web.archive.org/web/19990428111841/www.ebay.com/, 19 pages.
Aaddzz, http://web.archive.org/web/19980130092804/www.aaddzz.com pp. 1-42.
Complaint for Patent Infringement filed on Mar. 12, 2012 in the United States District Court, Northern District of California, San Jose Division, CV12-01212, *Yahoo! Inc.* vs. *Facebook, Inc.*, 19 pgs.
U.S. Appl. No. 13/175,023, filed Jul. 1, 2011.
U.S. Appl. No. 13/175,014, filed Jul. 1, 2011.
U.S. Appl. No. 13/175,037, filed Jul. 1, 2011.
U.S. Appl. No. 13/617,647, filed Sep. 14, 2012.
U.S. Appl. No. 13/617,588, filed Sep. 14, 2012.
U.S. Appl. No. 13/614,947, filed Sep. 13, 2012.

\* cited by examiner

METHOD AND SYSTEM FOR OPTIMUM PLACEMENT OF ADVERTISEMENTS ON A WEBPAGE

This application is a continuation of application Ser. No. 11/963,551, filed Dec. 21, 2007, which is a continuation of application Ser. No. 10/366,853, filed on Feb. 14, 2003, now U.S. Pat. No. 7,373,599, issued on May 13, 2008, which is a divisional of application Ser. No. 09/285,929, filed on Apr. 2, 1999, now U.S. Pat. No. 6,907,566, issued on Jun. 14, 2005, all of which applications are incorporated by reference in their entirety.

BACKGROUND OF THE INVENTION

Field of the Invention

The present invention relates to a method and system for optimizing the placement of graphical objects, e.g. advertisements (ads), topic tiles, or the like on a page, e.g. a webpage, so that an event associated with the objects is more likely to occur. Such an event would include the incidence of a user identifying, or clicking on the object with a pointing device.

Description of Related Art

The Internet provides a fast, inexpensive, and convenient medium for information providers to make information available to users on a website. Information in such websites might include, for example, sports scores, movie reviews, daily news, stock quotations, and the like. While password protected pay-sites exist on the internet, websites can generally be accessed at no cost to the user. This presents a problem regarding revenues returned in relation to providing a website full of information. Some website providers are funded to distribute various information to the public, for example NASA (National Aeronautics and Space Agency) or other such public agencies. Still other providers utilize their website as a commercial means in itself to sell various products, such as books or compact discs. Regardless of such external funding, the generation of revenue from a website is proving to be increasingly important, as there are costs inherent in creating, providing, and maintaining a website. Moreover, as Internet traffic continues to increase, the opportunities for the generation of revenue in association with those contacted sites also tends to increase.

In response to such concerns, website providers are increasing the amount of advertising space on their webpages in order to generate more revenues. The advertisements (or ads) appear as banners, blocks, or tiles on various portions on the webpage. Typically, an advertisement serves as a click-through point to sources of more information about that particular advertiser or topic. In other words, the advertisement exists as a graphical object which has a link to other information. The user typically chooses or identifies the object by clicking on it with a computer pointing device. The identification of the object invokes the link, and hence is often referred to as "click-through."

As with newspapers and other such advertising mediums, factors such as the location and size of the ad on a webpage will affect the price charged. Ads appearing at the start of the webpage will usually command a higher price than ads appearing at the end. This is particularly true for ads which appear further down from the initial webpage screen (as limited by the size of the user's display device). Web browsers usually require the positive act of a user scrolling down a page in order to view an ad located further down from the top. A user who sifts through web pages based upon the initial material visible on the page often overlooks such lower placed ads. Ultimately, each advertiser wants to their ad to be seen, and to increase the amount of click-throughs, or viewing traffic, which visits its particular website or webpages as a result of a click-through on its ad.

Generally, most sites sell their advertising as a function of cost per thousand impressions, where an impression is counted as an instance of the ad appearing on a webpage. Ads can be randomly placed on a webpage, or advertisers might choose locations on the page. In the latter instance, advertisers might be required to spend considerable time, money, and resources deciding where to place their advertisements, with the hope and anticipation of their ad being noticed, read, and even acted upon by the user. For instance, ads directed to younger Internet users might be placed on websites related to young celebrities, pop culture, or modern music. The ad might need to be placed near the top of the webpage in order to attract attention to the ad. This might require a costly expenditure by the advertiser, and would carry with it no assurances that the ad will attract any significant click-through traffic. As a result, the advertiser might be dissuaded altogether from placing the ad on a particular website or webpage. For every such decision by an advertiser not to place an ad, the revenues for a website or webpage which depends upon such revenues will be adversely affected.

Yet another way of selling advertising on the Internet is by charging the advertiser a certain amount for each click-through that occurs on a particular ad (often referred to as cost-per-click, or CPC). Such pricing structures might ultimately attract more attention from advertisers because the advertiser will not be required to pay unless the ad actually attracts click-through traffic. However, this pricing scheme shifts the impetus for deciding optimum ad placement back to the website or webpage provider, as no revenue will be generated for the provider if the user never clicks upon an ad.

Accordingly, a method and system are needed in this field which will serve to increase the chance of an event occurring for an object which is presented on a page. In the Internet context, a method and system are needed which would increase the amount of click-through traffic on ads presented on a webpage, and thereby increase the revenue generated by a website provider which sells ads on that webpage.

SUMMARY OF THE INVENTION

The present invention provides a method and system for placement of graphical objects on a page to optimize the occurrence of an event associated with such objects. The graphical objects might include, for instance, advertisements on a webpage, and the event would include a user clicking on that ad. The page includes positions for receipt of the object material. Data regarding the past performance of the objects is stored and updated as new data is received. A user requests a page from a server associated with system. The server uses the performance data to derive a prioritized arrangement of the objects on the page. The server performs a calculation regarding the likelihood that an event will occur for a given object, as displayed to a particular user. The objects are arranged according to this calculation and returned to the user on the requested page. The likelihood can also be multiplied by a weighting factor and the objects arranged according to this product.

As applied in context to an Internet based system, the present invention utilizes a unique system of gathering and grouping information about each particular user to the system, and then uses this information to optimize the event, or click-through traffic, for a particular graphical object, e.g. an ad, or set of ads, presented to that user. Optimization is achieved by calculating a click-through-percentage for a particular ad based upon sorted and categorized information about a particular user. This click-through percentage will consist, in part, of an estimation of the likelihood that a particular user will actually click on the ad presented. The click-through percentage is then used to group the ads, usually in descending order of calculated percentage, in the appropriate spots on a webpage. The ads might also be grouped according to click-through percentage times the cost-per-click for each ad. Topic tiles might also be displayed according to a similar formula, including for instance click-through-rate times the revenue-per-user.

According to either formula for ad placement, the revenue for the website provider will be significantly increased, as each click-through by a user will be more likely to occur, and also the page will be structured to generate an increased amount of revenue for each click-through. It has been found that the random placement of ads on a webpage yields a click-through-percentage of approximately 2-3%. By arranging the ads on a page in descending order of click-through-percentages (e.g. higher to lower), the general click-through rate has been found to at least double. By arranging the ads in descending order of click-through percentages times price-per-click, the overall revenue rate has been found to at least triple.

Other features can be summarized as follows: as a user interacts with various Internet sites, a file of information called a "cookie" is generated and maintained on a user's hard disk. A cookie typically records a user's preferences when using a particular site. A cookie is a mechanism that allows a server to store a file about a user on the user's own computer. The present invention includes providing a website which gathers and utilizes such information from the cookie file, but also generates and maintains a centralized database of information concerning each user. If a user is new to the site, then the user is redirected to areas where information about that user can be gathered. As the user proceeds through various website areas relating to topics such as movies or horoscopes, information such as age or zip codes can be gathered and stored for each particular user under a user identification (ID) number or tag. The data from the users is then analyzed, delineated, and placed in different groupings, or "bins." A device is used which creates meaningful bins, or in other words, bins of persons which have discernable behavioral differences between them. These bins might include, for example, demographical data such as persons of a certain income level, gender, or age grouping. This time intensive task of analyzing user information and creating different bins is performed as a background task, and therefore does not adversely affect the overall speed of the system.

An ad server device is also used which queries the system for information about each particular user. The bins of information are used to calculate a click-through-percentage for each of the various ads available, based upon an analytical method which includes, among other things, parameters relating to the user's information, the categorized bins of data, and the prior performance information for a particular ad. This system will allow multiple bins to be used for a performance calculation without adversely affecting the speed of the calculation. If an ad is new to the system, a performance estimation is made which will allow convergence toward the true performance percentages through subsequent click-throughs and related calculations for that ad. A set of ads is then returned by the ad server for display to a particular user on the contacted website and associated webpages. The performance calculation for each ad, along with its price-per-click, are used to determine placement of the ads on a website for optimum click-through occurrences and generation of revenue.

The system might also include an ad performance interface which will allow an advertising client to access various ad performance information from an ad performance database relating to the click-through-percentage and success of each ad. Yet another interface might be provided which will allow an advertiser to place ads directly into an ad database for access by the ad server.

Therefore, according to one aspect of the present invention, a system is provided wherein a page is requested by a user, with the page has positions for placement of graphical objects. Each object has associated with it a link to other information, and a certain event will invoke that link. Certain performance data is stored regarding the occurrence of events for objects in the system. The performance data is used to calculate a likelihood for each object that the event will occur for that particular user. The page is then returned to the user with a set of graphical objects arranged on the page, the objects positioned according to their event likelihood calculation.

According to another aspect of the present invention, a more specific example is provided. Namely, a system is provided wherein a website and associated webpages are made available by a web server, with the pages having ads arranged to provide optimized click-through generation of revenue deriving from the ads. The system gathers information relating to a user and stores this information in a central database under a user identification tag which is passed back to the user as part of the cookie data. The user data is further grouped into a variety of bins according to behavioral differences associated with such groups. A click-through-percentage is calculated for each ad based upon the user information, the associated bins, and the prior click-through-percentage associated with the ad. The ads are arranged on the webpage in descending order according to the calculated click-through-percentage for each ad. According to another aspect of the present invention described above, the ads are arranged on the webpage in descending order according to the calculated click-through-percentage for each ad times the click-through-price for each ad.

Another aspect of the present invention described above displays topic tiles in descending order according to click-through-rate for a particular tile, times the revenue-per-user.

In still another aspect of the present invention described above, the device which groups the user data into a variety of bins is configured to perform its task periodically in the background, thereby minimizing slow down of the overall system.

Yet another aspect of the present invention provides an ad performance database, and an interface for the advertising client to access the performance database and review the performance parameters relating to a particular ad displayed according to this method.

A further aspect of the present invention provides an ad content and placement database, and an interface for the advertising client to place ads directly into the system.

Other aspects and advantages of the present invention can be seen upon review of the figures, the detailed description, and the claims which follow.

DETAILED DESCRIPTION

The present invention provides a method and system for optimizing the event occurrences for graphical objects on a page. More specifically and for discussion purposes, a method and system are provided for optimizing revenues generated by a webpage. Optimization occurs through ranking of the ads (or topics) according to a click-through-percentage generated for each ad. The page might further be optimized by ranking the ads according to cost-per-click multiplied times the click-through-percentage. This will create a webpage that has both a high likelihood of click-throughs, and maximum revenue for each click-through that actually occurs. A detailed description of the invention is provided with respect to FIGS. 1-6.

Figure 1:
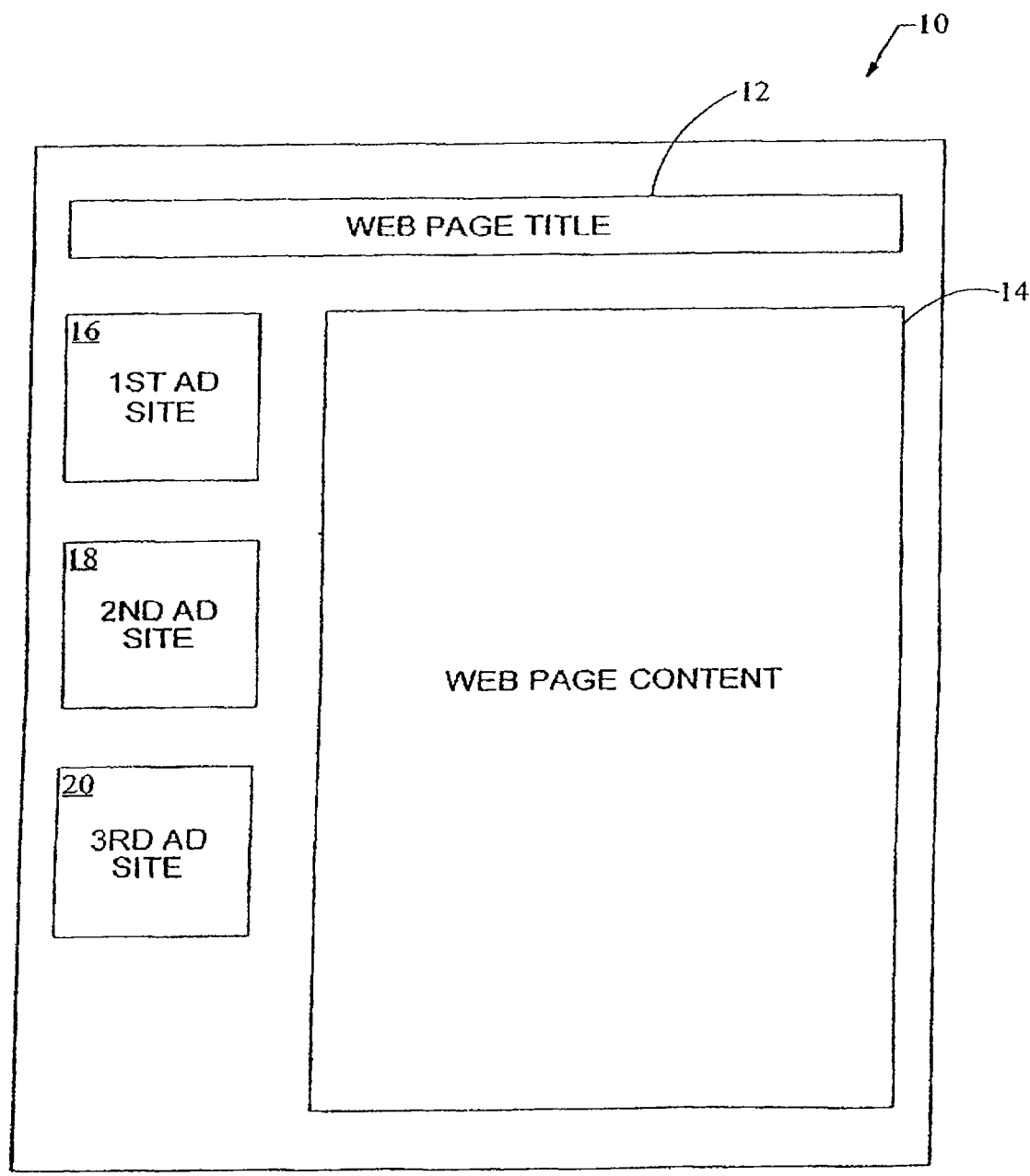
FIG. 1 is an example of a prior art webpage in which ad sites are arranged to randomly receive placement of ads.

FIG. 1 shows a generalized block diagram layout of a prior art webpage 10. This page contains a web page title block 12, and a web page content block 14. A sequence of ad sites 16-20 are shown which receive and display ads configured to fit in these spots. In the past, such ads have been placed on the page according to an advertisers preferred (and/or paid for) page location. Alternatively the ads have been randomly placed upon the page, with some consideration for not repeating ads which a user might have seen before. The randomized placement of ads on a webpage has been found to result in a click-through-percentage for each ad of approximately 2-3%.

Figure 2:
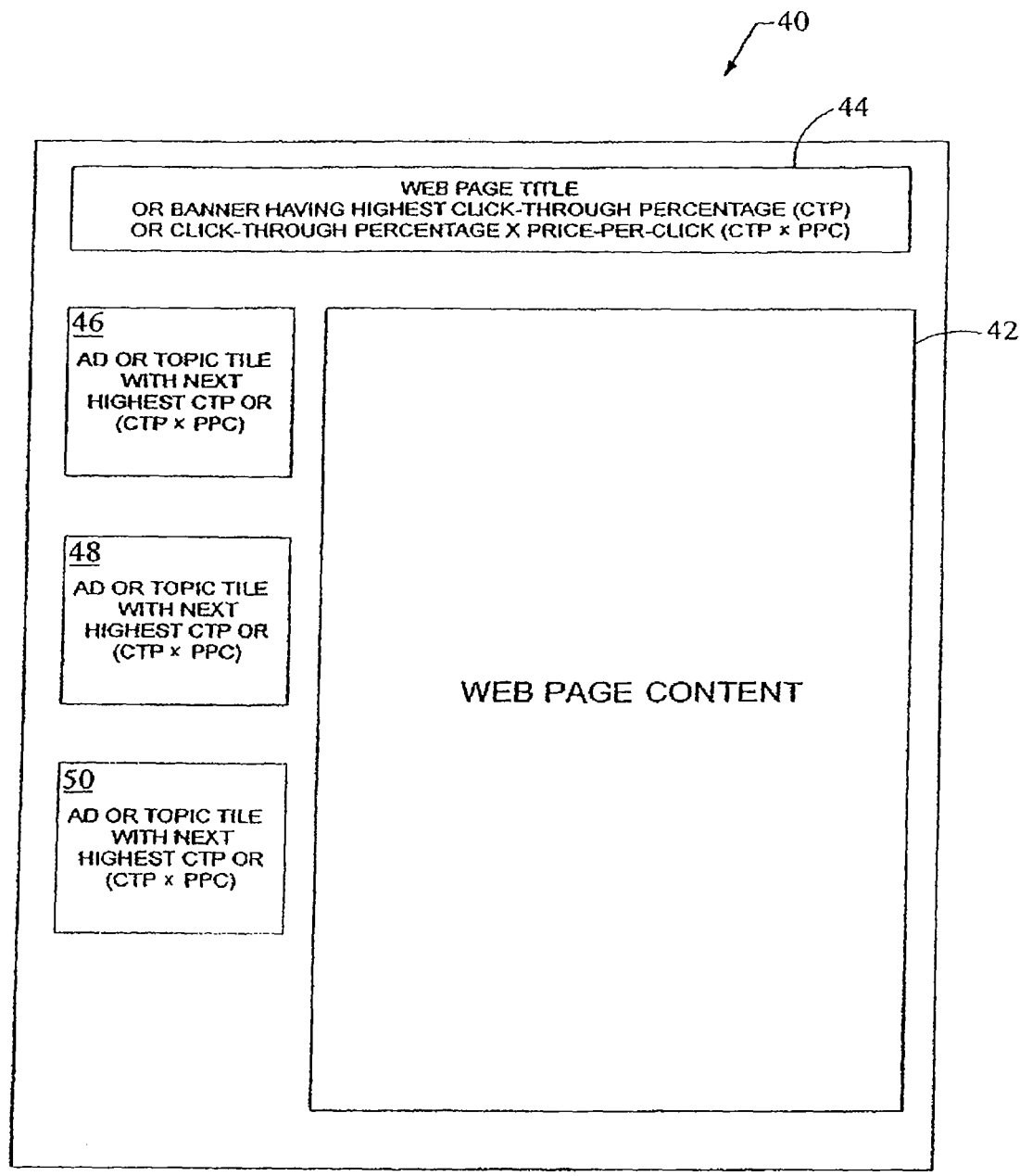
FIG. 2 is an example of a webpage according to the present invention in which the ads (or topic tiles) are arranged in descending order by their click-through-percentage (CTP) or CTP times price-per-click (CPC).

FIG. 2 shows an example block diagram layout of a webpage 40 according to the present invention. A generalized web page content block 42 is shown in the right-center of page 40. In addition, the peripheral blocks for placement of ads, or topic tiles, are arranged in order to maximize revenue generation for the webpage. Note that a topic tile might consist of a click-through point for more sites and information about a particular topic, including for instance horoscopes or personals ads. In one embodiment, the most prominent block on the page, e.g. the uppermost banner block 44, will carry ads that have the highest probable click-through-percentage for a particular user. Ads with the next highest calculated click-through-percentage will be displayed in the next most prominent spot on the page, and so forth. The ads are typically grouped from top to bottom in descending order of calculated click-through-percentage, as shown by blocks 46-50. If an ad spot is designated as more prominent, i.e. the ad spot is located in the unscrolled center of the user's display, then the click-through-percentage ranking and display of ads will follow the relative prominence designations for a particular page. Webpages arranged according to this method have been found to generate at least twice the revenue of webpages having randomly place ads.

In yet another embodiment, the ads can also be sorted and displayed according to a method which multiplies the calculated click-through-percentage times the cost-per-click for each ad. Under this method, the cost that the advertiser pays for each individual click-through on an ad will factor into the placement of the ad on the webpage. A more expensive ad with a moderate click-through-percentage might earn a more prominent position than an ad with a high click-through-percentage, but having a low price-per-click. If the multiplied result of the two factors produces a higher number, than the revenue generated from display of that particular ad will also be higher. Hence, such an ad will be displayed in more prominent position on the webpage in order to encourage more click-throughs by the user. Webpages arranged according to this method have been found to generate at least three times the revenue per page over webpages having randomly placed ads.

Figure 3A:
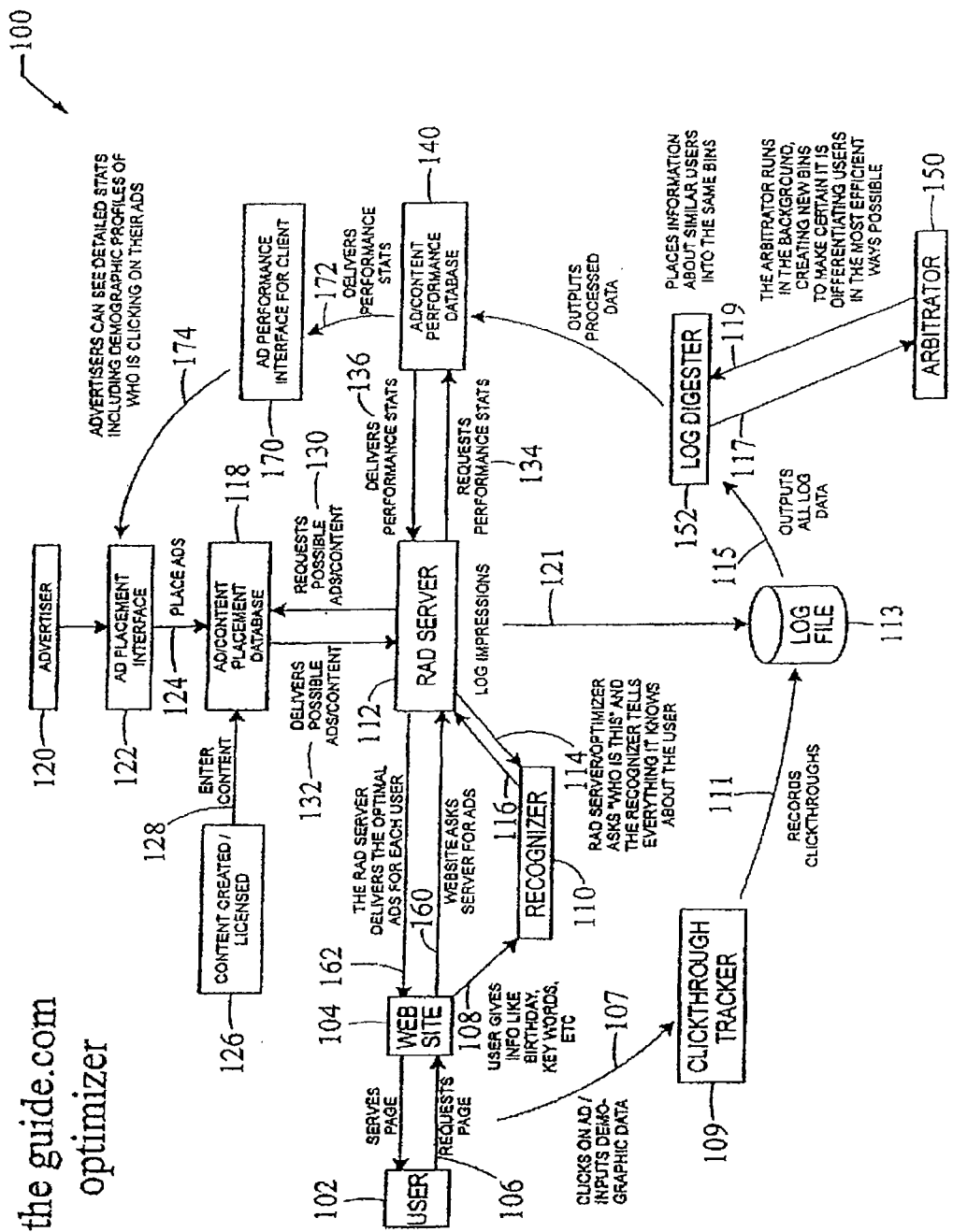
FIG. 3(a) is a block diagram of the functional components used for arranging the ads according to FIG. 2.

FIG. 3(a) shows a block diagram of a system or network 100 for optimizing placement of ads on a webpage according the arrangement methods described above. While the elements are discussed in a certain order below, many of the processes occur simultaneously, or in other order sequences as necessary. As shown, a user 102 contacts a website 104 and requests a page 106. During the process of interacting with the web site, the user 102 will provide personal information 108 such as their birthday, gender, zip code, and the like. This information is sent from the web site 104 to a component used for recognizing certain characteristics about a user, hence referred to as the Recognizer 110. Depending upon the status of the user (e.g. new to the network, new to the website, or known by the system), the interactions of the user, website, and Recognizer will vary. A centralized database is used, however, to store various information which has been collected about a user. The information is accessible via a user identification (Id) tag or number, which is created for each user. The interactions of the user, website, and Recognizer are detailed further in the discussion of FIGS. 4, 5, and 6 below.

In essence, when a site wants to show a page, it contacts an ad server component 112, shown at the center of the network 100 in FIG. 3(a). This device might also be referred to as a relational server component, and is hence referred to as the Rad Server. The site contacts the Rad Server and indicates which webpage and website will be shown, as well as the centralized Id of the user who will view the page: The Rad Server 112 performs the overall function of gathering the necessary information regarding a particular ad (or set of ads) and the particular user and generating a set of ads which have been optimized for placement on a webpage according to a calculated click-through-percentage (or click-through-percentage times price-per-click) for that user.

Figure 3B:
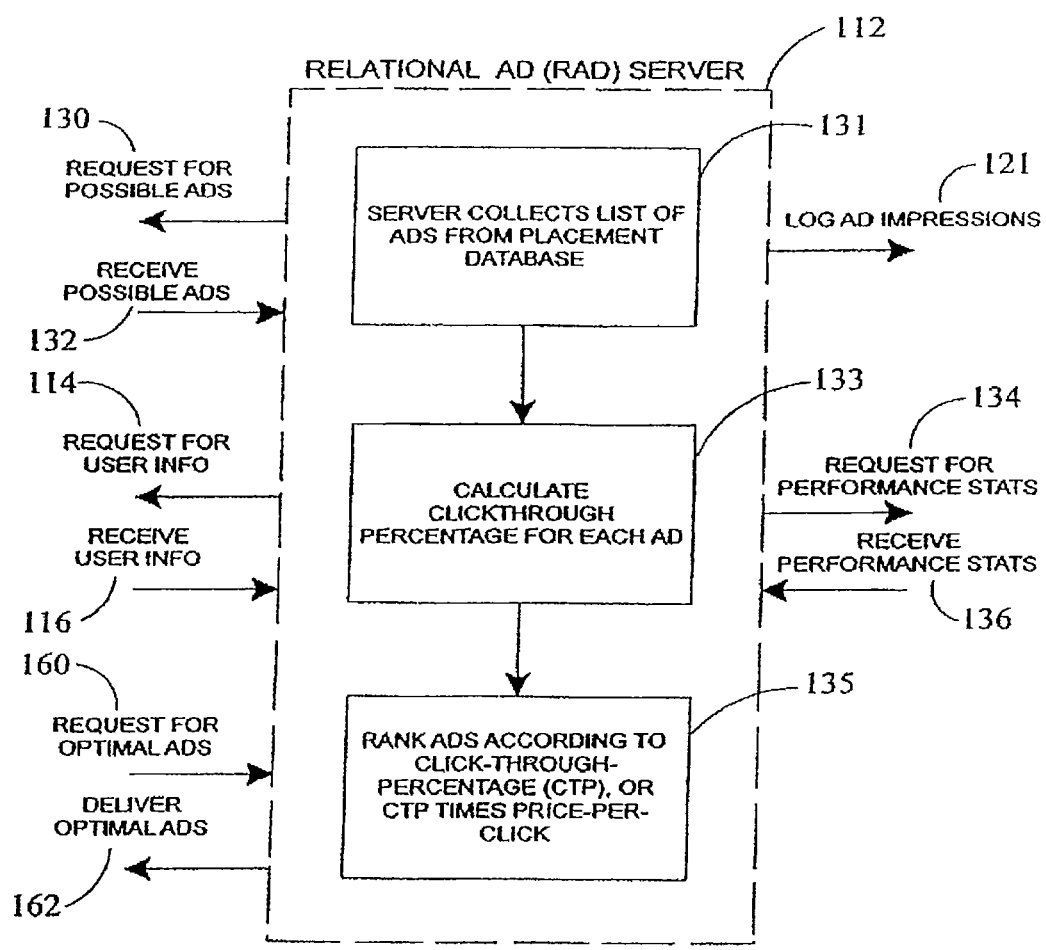
FIG. 3(b) is a block diagram of the Relational Ad (RAD) Server component of FIG. 2.

Referring now to both FIGS. 3(a) and 3(b), additional operational steps of the Rad Server are shown. Initially, the Rad Server 112 will query the Recognizer 110 for as much information 114 as is known about the particular user. The Recognizer then returns the information requested 116 back to the Rad Server 110 for use in requesting possible ads for placement and performing ranking calculations regarding those ads.

In order for the optimizer system to have ready access to a large store of ads, an ad/content placement database 118 is provided for storing a plurality of ads, which might be used for possible display. The ad/content placement database 118 might contain, for example, information about each ad contract, e.g. price per impression, price-per-click-through, constraints on pages or positions where the ad may be placed, and/or constraints on demographic variables which must hold for the ad to be presented. The database 118 might also contain information associated with different page layouts, e.g. the number of banner or ad spots available.

Such ads are created and/or purchased by the advertiser 120 who might use an ad placement interface 122 (which is optional) to place ads 124 in the database 118. The interface 122 could be web accessible and would guide the advertiser 120 through the necessary steps for creating and uploading an ad into the database 118. Alternatively, the general content of the ads is created and/or licensed 126 by administrators of such accounts and entered 128 into the ad/content placement database 118. The Rad Server 112 requests possible ads or content material 130 based upon information from the particular user 102 from the ad/content placement database 118. The database 118 then returns the possible ads 132 for placement on the webpage that fit the particular characteristics of the user 102.

With the possible ads 132 now collected, as shown by element 131 in FIG. 3(b), the Rad Server 112 performs a click-through percentage calculation for each ad, as shown by element 133 in FIG. 3(b). This calculation further requires access to performance information for each ad. Accordingly, an ad/content performance database 140 is provided which stores click-through-percentage data for each ad, as well as data concerning the grouping of users into different categories, or bins. A processing device, hereafter referred to as the Arbitrator 150, takes information gathered and stored about the users and processes this information into useful bins. The user data is sampled and bins are continually created which differentiate users in optimal ways for placement of ads. For example, a bin of all users under 14 years old might be created as one separate bin, rather than all users under 18 years old. This strategy for categorizing users becomes important when trying to predict or calculate a click-through-percentage for a given ad, or set of ads.

Referring again to FIG. 3(a), when a user clicks on a particular ad as shown by 107, a click-through tracker 109 is provided to track and then record the click-throughs 111 into a log file 113. The log file 113 also collects ad impression data 121 from the Rad Server 112. The log file 113 outputs the log data 115 into a device referred to as a log digester 152. The log digester 152 interacts with the Arbitrator 150, as shown by dataflows 117 and 119. The log digester 152 processes through all the user data, and places each bit of user data in its appropriate bin according to directions from the Arbitrator 150. The Arbitrator 150 runs periodically to determine how best to differentiate among users. The more differences that the Arbitrator finds, then the more efficiently it will be able to deliver ads that users will click on, or content that users will enjoy. Both the Arbitrator 150 and log digester 152 functions are generally time intensive operations and can take significant processing resources. In this embodiment, these tasks are shown to run in the background so as not to slow down the overall system performance. Typically, the Arbitrator 150 will be configured to interact with the log digester 152 every 15 minutes or less and the log digester 152 will output processed data to the ad/content performance database 118. The ad/content performance database 118 is therefore a static database that is updated periodically from the log digester 152. The update rate is variable and can be further improved through via system code optimization, increased processor speeds, dedicated hardware, and the like.

Referring again to FIGS. 3(a) and 3(b), the Rad Server 112 sends a request 134 for performance statistical data (or performance stats) to the Ad/Content performance database 140 and the requested performance stats 136 are returned to the Rad Server 112. A click-through-percentage 133 is calculated for each ad based upon the performance stats and the user information. The Rad Server 112 thereafter ranks the ads according to a desired arrangement method 135. While other equivalent methods are intended to be included within the scope of this invention, the methods discussed above include arranging the ads according to: click-through-percentage; or click-through-percentage times price-per-click for each ad. Topical tiles might also be arranged according to the click-through-rate for each topic, times the revenue-per-user.

Referring again to FIG. 3(a), the website 104 requests ads from the Rad Server 112 as shown by dataflow 160. After the steps described above are performed, the Rad Server 112 delivers a set of ads for display to the user which have been optimized for increased click-throughs, and/or increased revenue generation for the webpage provider.

Yet another interface 170 might (optionally) be provided which would provide the Advertiser 120 with the ability to monitor and track the performance of their ads. The ad performance interface 170 would collect performance stat data 172 from the ad/content performance database 140. The interface would thereafter provide user-friendly and viewable data 174 to the client regarding detailed stats, including for instance demographic profiles of who is clicking on their ads. Such information could prove invaluable to the advertiser for targeting future customers with particular ads. The information would also serve to demonstrate the success rate, and thereafter aid in setting the pricing structure of ads, in order for the network provider to further increase revenues.

Figure 4:
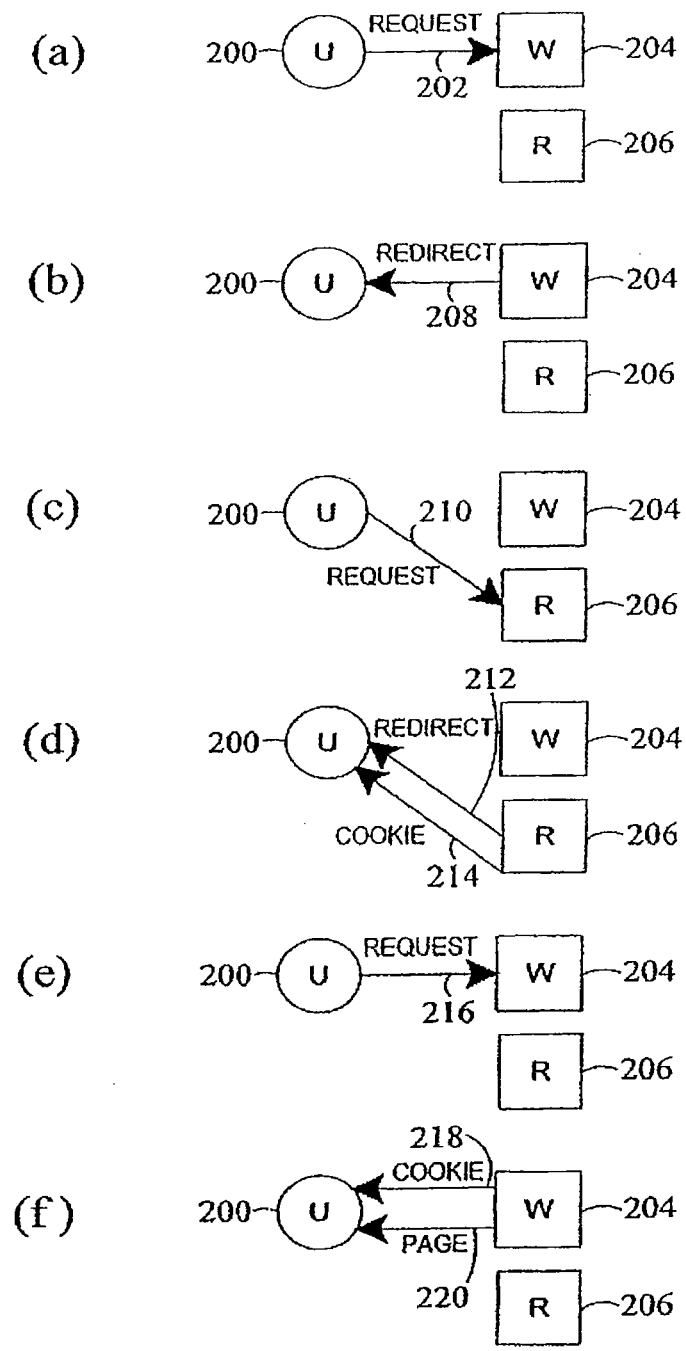
FIG. 4 is a block diagram of a sequence of interactions between the user, web site, and Recognizer elements of FIG. 3(a), wherein a user is new to the optimizer network.
Figure 5:
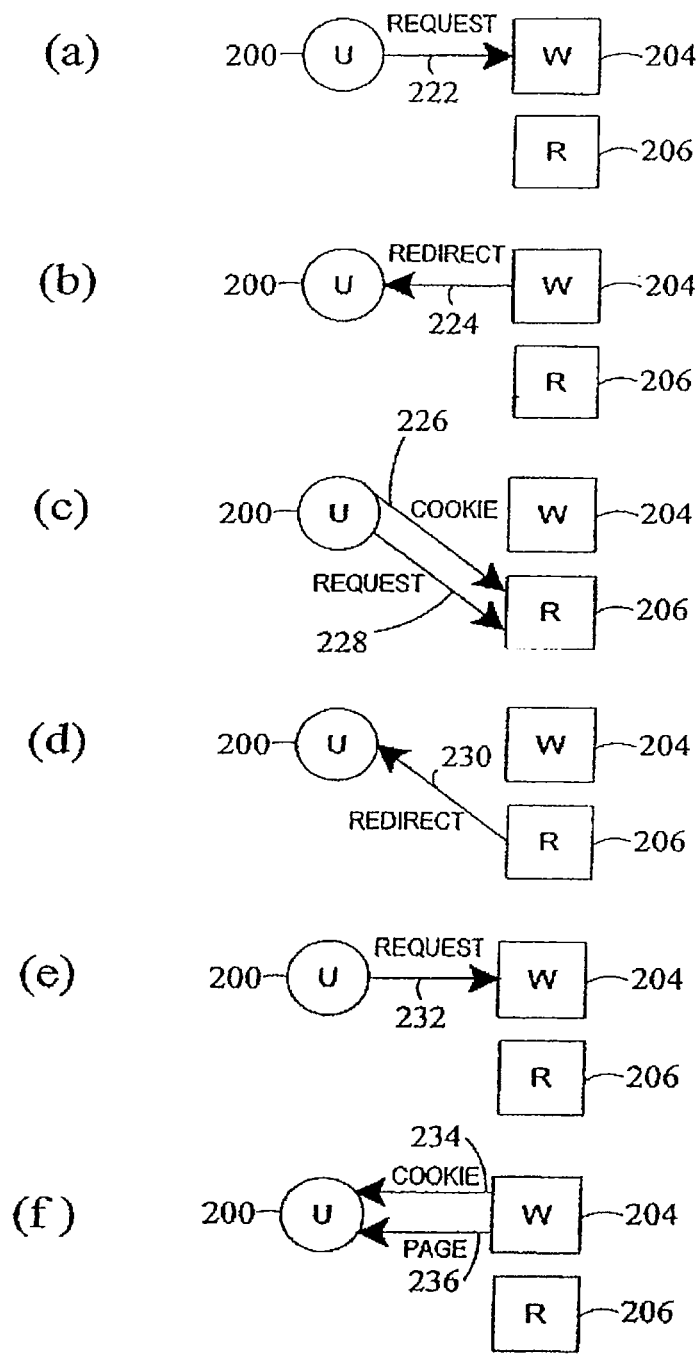
FIG. 5 is a block diagram of a sequence of interactions between the user, web site, and Recognizer elements of FIG. 3(a), wherein a user is new to the website, but is already recognized by the optimizer network.
Figure 6:
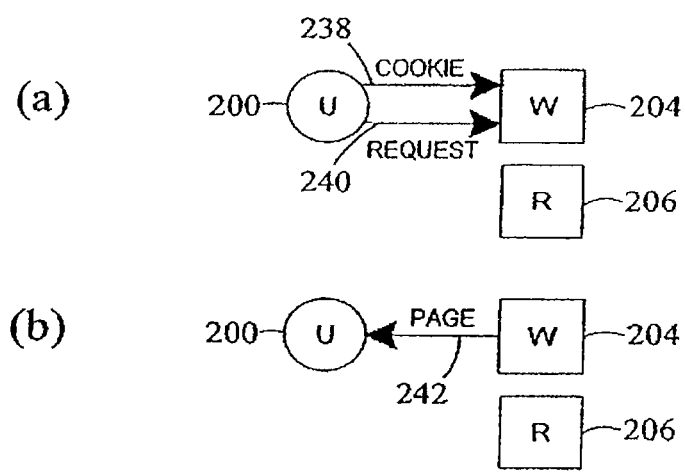
FIG. 6 is block diagram of a sequence of interactions between the user, web site, and Recognizer elements of FIG. 3(a), wherein a user has already visited the web site, and is already recognized by the optimizer network.

The optimizer 100 further uses a unique sequence of steps to gather information from each particular user. These sequences are shown in FIGS. 4, 5, and 6. Normally, a cookie is used by websites to detect information about a user. A cookie is a special text file that a website stores on the user's harddrive. Typically a cookie records a user's preferences when using a particular site. Using the Internet's Hypertext Transfer Protocol (HTTP), each request for a webpage is independent of all other requests. For this reason, the webserver generally has no memory of what pages it has sent to a user, or information about that user. A cookie is a mechanism that allows the server to store its own file about a user on the user's own computer. The file is typically stored in the subdirectory of the browser directory. The cookie subdirectory will contain a cookie file for each website which a user has visited, and which uses cookies. Cookies have been previously used to rotate the ads that a site sends so that a page does not keep sending the same ad as it sends a succession of requested pages. Cookies have also been used to customize pages based upon the browser type. Generally, users must agree to let cookies be saved for them, and such is the common practice as it speeds up web service. Yet another practice is for a user to create a file of personal information, or a profile, for use by a contacted website.

According to the present invention, the previously mentioned centralized Id number or tag is created for each user and provides access to stored information about the user within the optimizer system. When a site learns a new piece of information about a user, e.g. zip code, this information is sent to the Recognizer which enters this information into the centralized database. While many different forms of databasing would provide an equivalent result, the preferred embodiment uses a non-relational database that has been written for scalability and speed. When a site queries the Rad Server for a set of ads to place on a page, the site passes the centralized Id to the Rad Server, which in turn requests any relevant information associated with that user Id from the Recognizer database. The Recognizer database might also be queried by individual site, e.g. for dynamically targeted content generation. Separate authentication would be provided for read and write access to the Recognizer database.

Hence, when the Rad Server 112 requests user information, then the databased information can be readily provided via the Id. FIG. 4 shows the sequence of steps that occur when a user is new to the network. In step (a) the user (U) 200 sends a request 202 to the web server (W) 204 for a page of information. In step (b), the web server 204 redirects 208 the user 200 to the Recognizer (R) 206. In step (c), the user request 210 is redirected via a redefined URL (uniform resource locator). The Recognizer 206 assigns a new Id to the user and saves it in a database. In step (d), the Recognizer 206 redirects 212 the user 200 back to the web server 204 with the user Id appended to the URL. The Recognizer 206 also sends a Recognizer cookie file 214 back to the user 200. In step (e), the user 200 sends a request 216 for the original page desired, but with the Id appended. In step (f), the web server 204 returns its own cookie 218 with the Id, along with the webpage 220, which the user requested (with the ads optimally arranged).

FIG. 5 shows the sequence of steps which occurs when the user is new to the web server, but has already been databased in the optimizer network. In step (a), the user 200 requests 222 a webpage from the web server. In this instance, the website has not been previously visited by the user. In step (b), the web server 204 redirects the user 200 to the Recognizer 206. In step (c), the user 200 requests 228 the URL from the Recognizer 206. Since the user has already visited the optimizer network, they have a cookie 226 which is passed back to the Recognizer 206. In step (d), the Recognizer 206 redirects 230 the user 200 to the site with the Id appended. In step (e), the user 200 sends a request 2232 for the original page desired, but with the Id appended. In step (f), the web server 204 returns its own cookie 234 with the Id, along with the webpage 236, which the user requested (with the ads optimally arranged).

FIG. 6 shows a sequence of steps which occurs when the user has already visited an optimizer network site. In step (a), the network has already established a cookie for the user with the centralized Id. The Recognizer 206 is therefore not involved in the interaction. The user 200 sends a request 240 for a webpage to the web server 204, along with the existing cookie file 238. In step (b), the web server 204 responds by sending the requested webpage 242 (with the ads optimally arranged).

In each case, the website will request HTML code from the Rad Server 112 to place in the appropriate advertising blocks of the webpage. The Server outputs this information to the user, and the information is thereafter decoded and arranged by the user's web browser. When the user clicks on an ad, they are redirected through optimizer so that the click-through can be counted, and the user is thereafter sent to the URL specified by the Advertiser.

In providing further details to elements, described above, the Arbitrator 150 in FIG. 3(a) has the task of creating many different bins of data as characteristics about the users are learned and delineated. Normally, when any new factor (e.g. a new bin) is introduced into a system like the present, the complexity of implementation increases greatly, as each factor will typically need to be multiplied by every other existing factor in the system. As a result, variables must be partitioned into a small number of equivalence classes in order to make feasible the learning problem. This creates pressure towards choosing a small number of bins for each variable. However, in the limit that there is only partition (one type of user), the learning problem is greatly simplified, but the available information is not being maximally exploited for monetary gain. This is the classic "information/complexity" tradeoff in learning theory: the more powerful the model, the more difficult it is to learn the parameters.

While a variety of solutions might be applied, the preferred embodiment of the present invention applies a classical statistical technique for hypothesis testing, i.e. the generalized likelihood ratio test, as follows. Starting with a given a particular random variable X which takes values in the set $S_X$, and a set of ads A such that for each ad a∈A and value x∈$S_X$, the result includes associated impressions counts $I_X(x,a)$ and click-through counts $C_X(x,a)$. Next, consider a function f: $S_X \rightarrow S_B$ which assigns values in $S_X$ to equivalence class labels in $S_B$. Associated with each b∈$S_B$ are the impression and click-through counts $I_B(b,a)=\Sigma_{x|f(x)=b} I_X(c,a)$ and $C_B(b,a)=\Sigma_{x|f(x)=b} C(x,a)$, respectively. These counts can be used to assign a score to f for a given ad a∈A via $$\phi(f, a) = 2\left(\sum_{b \in S_B} \max_\lambda \{\log p(I_B(b, a), C_B(b, a), \lambda)\}\right) -$$
$$2 \max_\lambda \left\{\sum_{b \in S_B} \log p(I_B(b, a), C_B(b, a), \lambda)\right\}$$

Where p is standard binomial likelihood given by $$p(c, n, \lambda) = \binom{n}{c} \lambda^c (1-\lambda)^{n-c}$$

This test can be interpreted as measuring the difference between the "explanatory power" that is achieved by assuming that the click-through rate for the ad in question varies in any fashion across the equivalence classes in question (first term), versus the "explanatory power" obtained by assuming that the click-through rate is identical across equivalence classes (second term).

The asymptotic distribution of $\phi$ is known to be $X^2$ with degrees of freedom $|S_B|-1$, which allows proper normalization of the score with respect to number of equivalence classes. The following formula is used to transform $\phi$ into a random variable approximately distributed as zero-mean unit-variance Gaussian.

$$z(f, a) = \sigma(|S_B| - 1)^{-1}\left(\frac{\phi(f, a)}{|S_B| - 1} - \mu(|S_B| - 1)\right)^{1/3}$$

$$\mu(n) = 1 - \frac{2}{9n}$$

$$\sigma(n) = \sqrt{\frac{2}{9n}}$$

As can be seen from the formula, this normalization discourages partitioning into a large number of equivalence classes (i.e., large $|S_B|$); however, if the increase in explanatory power (i.e., φ) is sufficiently large it can overcome this "bias" against fine-grained partitioning. In this manner the information/complexity tradeoff is represented.

The above score is averaged over the current population of ads to assign a score Q to the potential partitioning f, $Q(f)=\Sigma_{a \in A}z(f,a)$. In principle, a procedure to enumerate all possible partitionings and choose the one with the largest score Q is possible, but (currently) in practice a human suggests several possible ways to partition the data, Q is calculated for each candidate partition, and the partitioning with the highest score is used in the online system. Since the complexity of model supported by the data increases with the amount of data, the appropriate partitioning for the system can change with time, e.g., if the amount of visitors to the site increases dramatically. Thus the arbitrator is used both when first introducing a variable into the system, and for periodically tuning the distinctions the system makes in order to maximize performance.

In providing further detail to certain elements described above, element 133 in FIG. 3(b) describes a click-through-percentage calculation which is performed for each ad. This calculation provides a probability or likelihood, expressed as a percentage, that a user will click on a particular object or ad. While many different processes might be used within the scope of optimizing revenue generation through the placement of ads by using click-through-percentage, the present invention employs the technique further detailed as follows: The value of placing an ad includes a fixed, known amount of revenue per impression (possibly even zero), plus some amount of revenue that would be generated if the ad were clicked on. Since clicking on the an ad is a random event, the Rad server attempts to estimate the average amount of revenue that results from click-throughs, which is given by the probability that the user will click on the ad times the amount of revenue generated when the ad is clicked on. The ad server is therefore attempting to maximize, on average, the revenue resulting from a particular assignment of ads to the page. The ad server estimates the probability of clicking on an ad using formulas derived from Bayesian statistical methodology, which click-through modeled as a binomial process, and with a prior model of advertisement appeal given by exponential distribution parameterized by a single parameter $p_0$.

First, the system should determine the value of factors used in predicting performance. Demographic information associated with a user Id is retrieved from the Recognizer. Other information is obtained from the site requesting the ad placement, e.g the page the ads will be shown on. Still other information, e.g. the time of day, is determined by the ad server.

Second, for each possible assignment of an ad to a spot on the page, and for each factor whose value is known, the ad server obtains the number of impressions and click-throughs seen for that ad in that spot with the factor in question. These counts are used to estimate the likelihood p that the user will click on the ad, according to the following formula:

$$\hat{p}(q, s, p_0) = \frac{\phi(q, s, p_0)}{\phi(q, s, p_0) + \varphi(q, s, p_0)}$$

$$\phi(q, s, p_0) = \alpha(c(s), i(s), p_0)\prod_{i=1}^{N}\theta(c(s|q_i), c(s|q_i)+i(s|q_i), \theta(c(s|q_i), c(s), r(i))$$

-continued $$\varphi(q, s, p_0) = (1 - \alpha(c(s), i(s), p_0))$$

$$\prod_{i=1}^{N}\theta(n(s|q_i), c(s|q_i)+i(s|q_i), \theta(n(s|q_i), n(s), r(i))$$

$$\theta(a, b, k) = \frac{a+1}{b+(1/k)}$$

$$\alpha(a, b, p_0) = \eta(b, p_0) - \sqrt{\eta^2(b, p_0) - 8(2+a)p_0}$$

$$\eta(b, p_0) = 2 + (2+b)p_0$$

$$n(s) = i(s) - c(s)$$

$$n(s|q_i) = i(s|q_i) - c(s|q_i)$$

where
q=context vector
c(s)=clicks count for content s
i(s)=impression count for content s
$c(s|q_i)$=click count for content s given factor i takes value $q_i$
$i(s|q_i)$=impression count for content s given factor i takes value $q_i$
r(i)=total possible values for factor i These equations incorporate the assumptions that factors are conditionally independent, factor values are distributed multinominally with a product exponential prior peaked at a uniform distribution, and that clickthroughs not conditioned on factor values are distributed binomally with an exponential prior peaked at $p_0$. $p_0$ is purposely chosen to overestimate the probability of click-through so that the estimator converges to the actual probability of click-through from above. This is particularly true for new ads in which little (or no) information is known. A less efficient system might, for instance, randomize all the ads 20% of the time, then measure the relative performance, and then optimize the placement of ads. The present system, however, proves to be much more efficient as optimization is constantly being performed. The present system serves to automatically balance the opposing goals of gathering data on newer ads and exploiting information about older ads. In this way, the number of impressions is greatly reduced which the system might need to show in order to make an accurate prediction of click-through rate for a particular ad.

Once derived, the list of possible assignments of ads to particular ad spots is sorted in descending order of expected revenue. While there are subsequent empty spots, the ad server examines the next assignment on the list, and accepts the assignment unless it would violate a placement constraint, in which case it is discarded. If possible assignments are exhausted before the page is filled, the Rad Server might then fill the remaining positions with a canonical identifier indicating the spot is to remain empty. The list of acceptable assignments in then returned to the requesting website.

The optimizer system can serve optimized ads to any site on the Internet. In addition to the above-described features, it is intended that the optimizer system will remain able to target ads to specific demographics. For example, the advertiser can target ads only to users between the ages of 25 and 35, or to users who live in zip codes which represent upper-level incomes. Such targeting is independent of the optimization scheme described above. In other words, an advertiser can target any age group it desires, regardless of whether or not that group aligns with one of the aforementioned data bins. Relatedly, the optimizer system can be overridden. If an advertiser wishes to purchase the right to an entire section of the website or webpage, the ads can simply be placed there without having to compete their way into that position on the page.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. A computer implemented method of providing placement of a plurality of graphical objects on a page accessible by a user, the graphical objects including graphic and text symbols, the page having positions for receipt of the objects, each object having at least one of a link to information provided by an advertiser, the link being invoked by an event identifying the object by a computer pointing device, the method comprising the steps of:
    at a data processing system including a computer configured for data communication with user computing systems,
        storing by the computer in a memory in data communication with the computer and retrieving by the computer from the memory performance data associated with the likelihood of the event occurring for each object;
        by the computer, arranging the plurality of graphical objects among the positions for receipt of the objects on the page according to the performance data;
        by the computer, communicating the page to the user;
        by the computer of the data processing system, providing data defining an advertisement performance monitoring interface accessible by the advertiser; and
        on the advertisement performance monitoring interface, providing, by the computer to the advertiser, data defining information retrieved from the memory about the performance data for objects of the advertiser and demographic information about users including the user.

2. A system for providing placement of a plurality of advertisements on a web page accessible by a user, the system comprising:
    a server operative in conjunction with stored data to provide to an advertiser an advertisement placement interface to receive advertisement data defining an advertisement from the advertiser and to store the advertisement data;
    memory storing data forming an advertisement placement database, the memory including the advertisement placement database being in data communication with the server to store information about advertisements including the advertisement data received from the advertiser; and
    memory storing data forming an advertisement performance database, the memory including the advertisement performance database being in data communication with the server to store performance data associated with past performance of advertisements in the advertisement placement database,
    wherein the server is further operative in conjunction with stored data from the memory to provide a plurality of advertisements including the advertisement defined by the advertisement data received from the advertiser in response to a request from a web site for the plurality of advertisements, the server prioritizing the plurality of advertisements relative to one another on a web page according to the performance data.

3. The system of claim 2 wherein the server is configured to provide as the advertisement placement interface a web accessible interface for access by the user to enter information about the advertisement, the server further configured to store the entered information in the memory storing data forming the advertisement placement database.

4. The system of claim 2 wherein the server is configured to provide as the advertisement placement interface a web accessible interface for access by the user, the web page arranged to guide the advertiser through necessary steps for creating the advertisement for storage in the memory storing data forming the advertisement placement database.

5. The system of claim 2 wherein the server is operative in conjunction with stored data to provide an advertisement performance interface to provide to the advertiser performance data associated with past performance of advertisements defined by data stored in the memory storing data forming the advertisement placement database.

6. The system of claim 5 wherein the server includes a processor operative with stored data and instructions to configure the advertisement performance interface to collect performance data from the memory storing data forming the advertisement placement database and provide to the advertiser through the advertisement performance interface viewable data based on the collected performance data.

7. The system of claim 5 wherein the server includes a processor operative with stored data and instructions to configure the advertisement performance interface to provide to the advertiser data defining demographic profiles of users interacting with advertisements provided to the users.

8. A computer implemented method comprising:
    by a server of a web-accessible computer system, storing in a portion of memory defining an advertisement database in data communication with the server data defining advertisements to be provided on user accessible web pages;
    by the server, providing to an advertiser interface data defining a web accessible advertisement placement interface accessible by advertisers, the web interface data including data to guide the advertiser through a process of creating advertisements and storing in the advertisement database advertiser data defining advertisements of the advertiser;
    by the server, storing in a portion of the memory defining an advertisement performance database and retrieving from the advertisement performance database data associated with the likelihood of user interaction with respective advertisements including the advertiser-created advertisements of the advertisement database;
    in response to data defining a request received at the server for advertisements to be placed on a web page, at the server selecting advertisements for placement on the web page according to the retrieved data associated with the likelihood of user interaction with respective advertisements; and
    delivering from the server data defining the advertisements selected for placement on the web page.

9. The method of claim 8 wherein providing the advertisement placement interface comprises:
    by the server, providing data defining the advertisement placement interface to the advertiser, the advertisement placement interface being accessible over a network by the advertiser and arranged to collect the data defining the advertiser-created advertisements from the advertiser.

10. The method of claim 8 wherein providing the advertisement placement interface comprises:
by the server, providing as the advertisement placement interface data defining an advertisement creation web page accessible by the advertiser;
on the advertisement creation web page, providing data defining advertisement creation information to the advertiser to guide the advertiser through respective steps for creating and uploading an advertiser-created advertisement to the advertisement database; and
on the advertisement creation web page, receiving data entered by the advertiser, the received data defining, at least in part, one or more advertisements of the advertiser to be stored in the advertisement database.

11. The method of claim 8 further comprising:
by the server, collecting data defining demographic information about users who interact with web pages during or after the interaction with the web pages by the users;
by the server, storing the data defining the demographic information in the memory; and
selecting advertisements for placement on the web page based in part on the demographic information.

12. The method of claim 8 further comprising:
at the server, providing data defining an advertisement performance monitoring web interface accessible by the advertiser;
on the advertisement performance monitoring web interface, providing to the advertiser performance data about advertisements of the advertiser.

13. The method of claim 12 further comprising:
by the server, collecting performance data for advertisements provided on user accessible web pages;
by the server binning the collected performance data according to demographic profiles of users accessing the web page for subsequent access to the binned performance data by the advertiser.

14. A computer implemented method comprising:
by a server, in response to data defining a request by the server from a web site, providing to the web site data defining a plurality of advertisements to be placed on a web page requested by a user;
by the server, determining how the plurality of advertisements should be arranged relative to one another on the web page based on performance data related to the likelihood of a respective advertisement being accessed by the user;
by the server, providing to the web site data defining how the plurality of advertisements should be arranged on the web page;
by the server, collecting performance data about user access of respective advertisements;
by the server, storing the performance data in a database; and
at the server, providing to an advertiser data defining a web accessible advertisement performance monitoring interface to enable the advertiser to access the stored performance data over the world wide web through the advertisement performance monitoring interface.

15. The method of claim 14 further comprising collecting, by the server, demographic information about users accessing the web site including users accessing respective advertisements, wherein providing an advertisement performance monitoring interface comprises providing by the server to the advertiser data defining demographic profile information about the users accessing the respective advertisements.

16. The method of claim 15 further comprising:
by the server, collecting demographic information from new users
by the server, storing in a database in a memory, which is in data communication with the server, data defining the demographic information in association with unique identifiers for the new users so that unique identifiers may be used for subsequent retrieval of the data defining the demographic information by the server;
subsequently, collecting by the server additional demographic information about activity by a monitored user; and
by the server, storing the additional demographic information in the database in association with the unique identifier for the monitored user.

17. The method of claim 16 further comprising:
by the server, processing stored demographic information for new users and monitored users into defined storage locations of the memory forming bins which differentiate users based on user demographics;
by the server, determining how the plurality of advertisements should be arranged relative to one another on the web page based on the binned information; and
by the server, providing advertiser access to the binned information through the advertisement performance monitoring interface.

18. The method of claim 14 further comprising:
by the server, storing in an advertisement database data defining advertisements;
by the server, providing to an advertiser data defining an advertisement placement interface to place advertisements in the advertisement database.

19. The method of claim 18 wherein providing the advertisement placement interface comprises providing by the server on the advertisement placement interface information to guide the advertiser through steps to create an advertisement and upload the created advertisement for storage in the advertisement database.

20. A computer implemented method comprising:
by the server, storing in a portion of a memory which is in data communication with the server, the portion of memory defining a database, data defining advertisements to be displayed on a web page requested by a user;
by the server, storing in another portion of the memory defining the database performance data for advertisements displayed on web pages;
by the server, in response to a request for advertisements, providing data defining a plurality of advertisements and data defining positioning of the plurality of advertisements relative to one another on a web page, the data defining positioning of the plurality of advertisements being determined by the server based on the performance data stored in the database;
by the server, providing an advertisement placement interface accessible by an advertiser to place a new advertisement in the database; and
by the server, providing to an advertiser data defining an advertisement performance monitoring interface to access the stored performance data in the database.

* * * * *